C. C. LAMB.
ATTACHMENT FOR CAMERAS.
APPLICATION FILED DEC. 20, 1910.
1,037,934.
Patented Sept. 10, 1912.
3 SHEETS—SHEET 2.
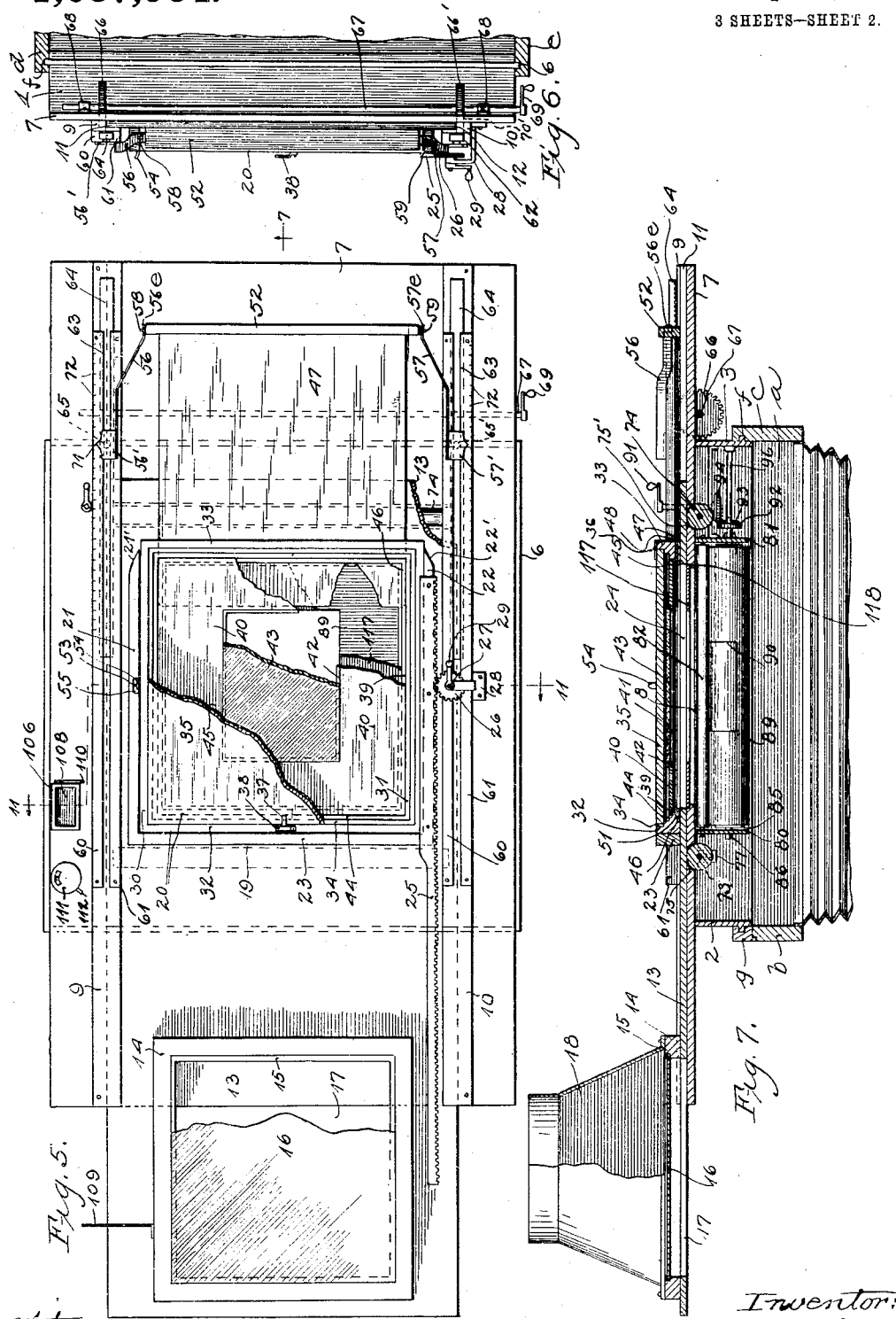
Witnesses:
Charles J. Schmid.
Nellie B. Dearborn
Inventor:
Charles C. Lamb
By Offield, Towle, Graves & Offield
Attys.

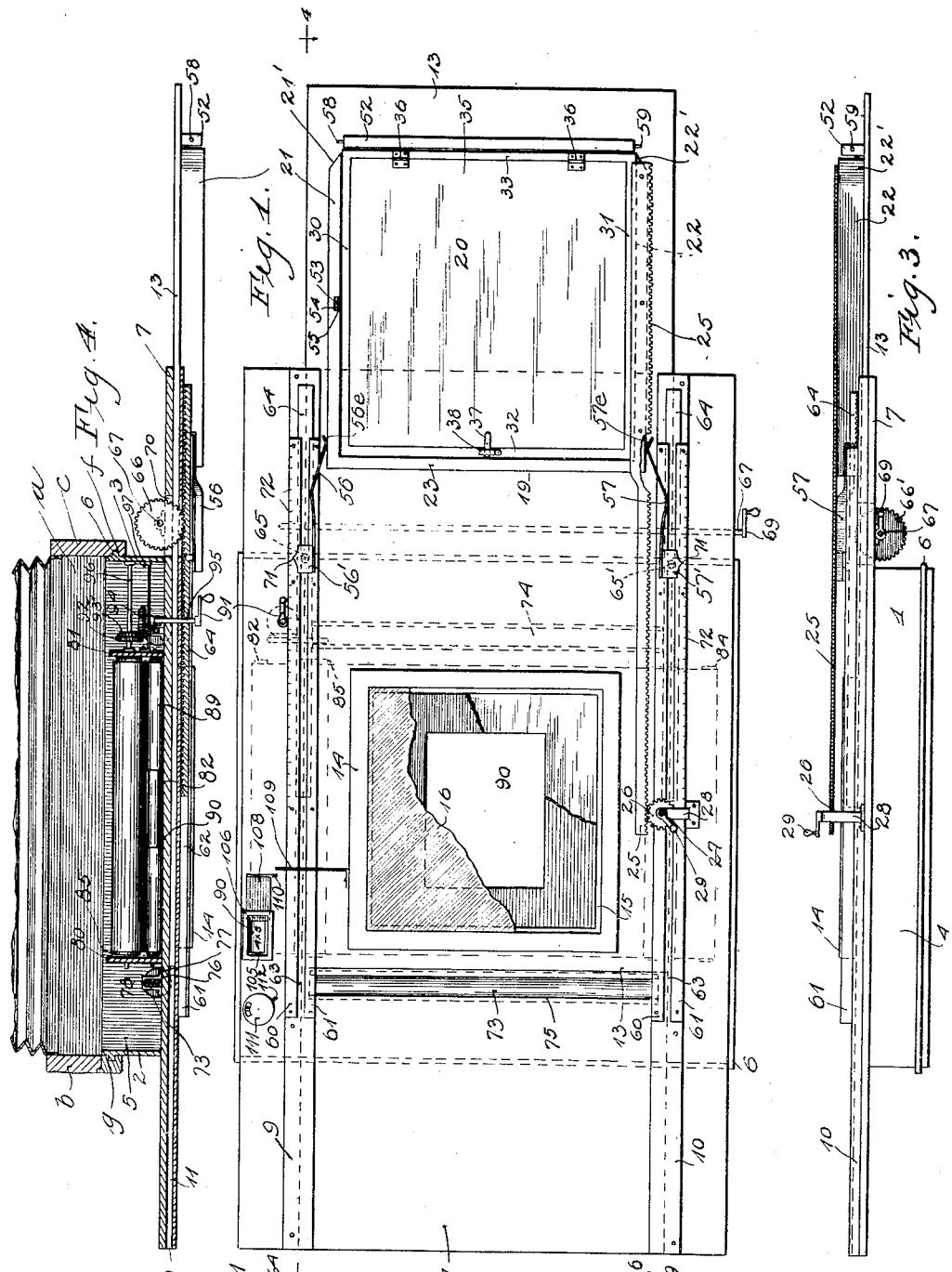

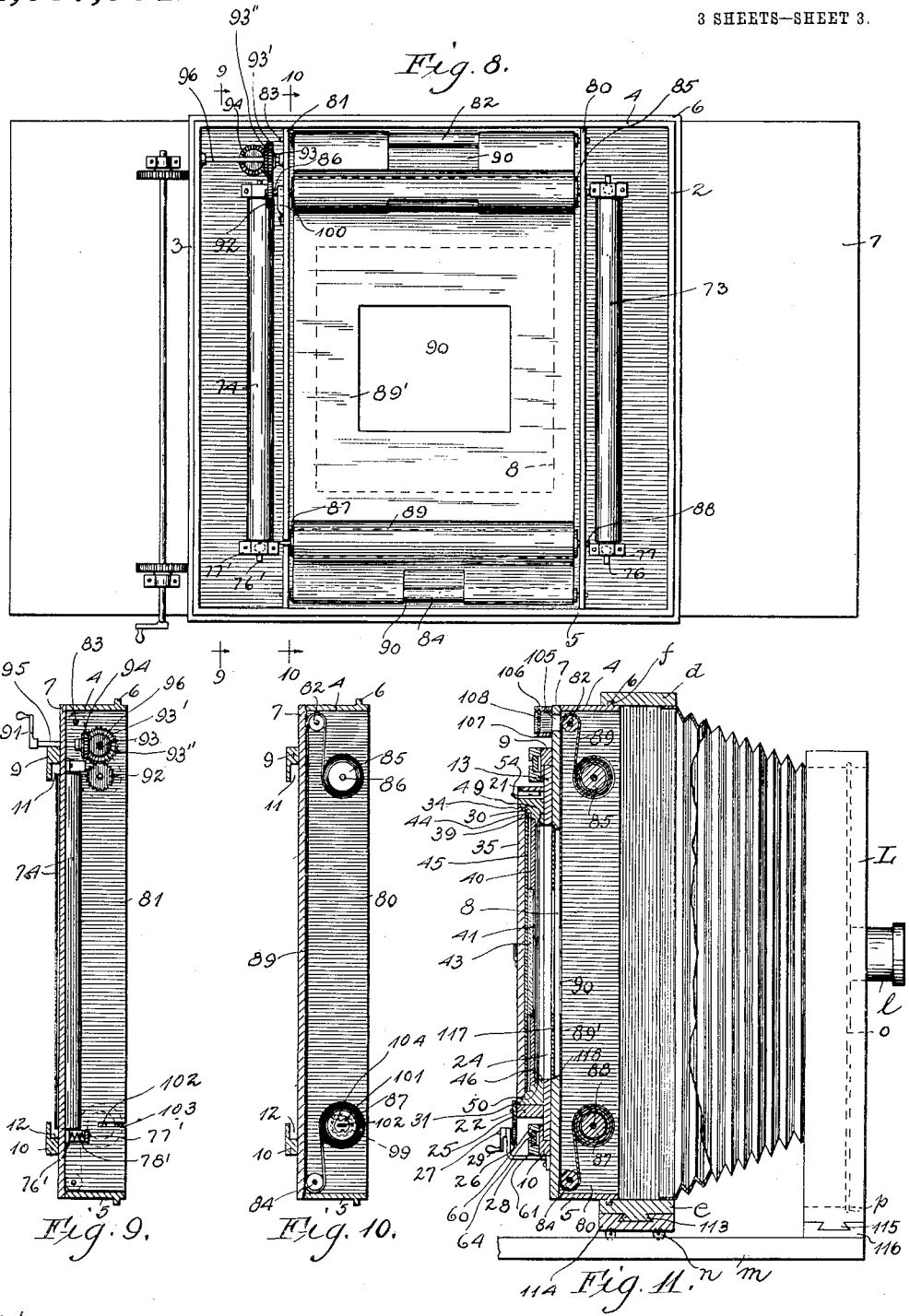

UNITED STATES PATENT OFFICE.

CHARLES CALVERT LAMB, OF JOLIET, ILLINOIS, ASSIGNOR OF FORTY-NINE ONE-HUNDREDTHS TO WILLARD M. McEWEN, OF CHICAGO, ILLINOIS.

ATTACHMENT FOR CAMERAS.

1,037,934.  Specification of Letters Patent.  Patented Sept. 10, 1912.

Application filed December 20, 1910. Serial No. 598,372.

*To all whom it may concern:*

Be it known that I, CHARLES CALVERT LAMB, a resident of Joliet, in the county of Will and State of Illinois, have invented certain new and useful Improvements in Attachments for Cameras, of which the following is a specification.

My invention relates to attachments for cameras and particularly to improved focusing and plate holder mechanism mounted in common on a structure adapted to be applied to a camera frame.

In prior photographic practice and procedure a camera is provided with a ground glass focusing plate which is first used to get the focus of the subject, whereafter a separate plate holder is inserted in the camera, usually by being slid into place in front of the ground glass holder, and then the exposure slide of the plate holder is withdrawn and the lens mechanism operated to take the picture. This procedure involves considerable time in the manipulation of the various separate parts, and furthermore this manipulation is apt to move the camera and to spoil the focus. Particularly where pictures are taken of living subjects it is very desirable that the least time expire between focusing and operation of the lens mechanism. Also where different sized pictures of the same subject are to be taken considerable time is consumed in rearranging the various photographic parts.

The main general object of my invention is, therefore, to provide improved focusing mechanism, plate holder mechanism, and size adjusting mechanism which can be operated readily and accurately with a minimum of time and whose operation will not upset the focal or other adjustments of the camera.

More specifically, the various objects of my invention are to provide a common supporting structure for focusing mechanism, plate holder mechanism and size adjusting mechanism, which structure can be substituted in a camera frame for the ordinary single plate holder; to provide construction and arrangement which will enable the focusing mechanism, the plate holder mechanism, and size adjusting mechanism to be quickly and accurately moved into the photographic field of the camera; to provide means for automatically accomplishing the withdrawal and reinsertion of the exposure slide upon adjustment of the plate holder mechanism into and out of the photographic field; to provide improved adjusting mechanism for determining the movement of the exposure slide relative to the plate holder frame; to provide means in the form of improved diaphragm mechanism for adjusting for the size of image, and improved mechanism for controlling such diaphragm mechanism; to provide improved indicating mechanism for indicating the condition of various parts; to provide improved means for preventing entrance of light during photographic operation; and also to provide other improved and desirable features of construction and operation.

The various features, construction, arrangement, and operation are brought out in the following specification and illustrated on the accompanying drawings, in which drawings—

Figure 1 is a rear elevational view of the attachment, showing the focusing mechanism in central position, Fig. 2 is a view taken from the left end of the attachment, Fig. 3 is a view of the lower side of the attachment, Fig. 4 is a sectional view taken substantially on plane 4—4, Fig. 1, Fig. 5 is a rear elevational view of the attachment, showing the plate holder mechanism in central position and parts being broken away to more clearly illustrate the construction and arrangement, Fig. 6 is a view from the right end of the attachment, Fig. 7 is a sectional view taken on plane 7—7, Fig. 5, Fig. 8 is a front elevational view of the attachment, Fig. 9 is a sectional view taken on plane 9—9, Fig. 8, Fig. 10 is a sectional view taken on plane 10—10, Fig. 8, and Fig. 11 is a sectional view taken along plane 11—11, Fig. 5.

The attachment involves a main supporting structure 1 in the form of a rectangular shallow box or frame having side walls 2 and 3 and top and bottom walls 4 and 5. Adjacent the front edges of these walls beads or slide tongues 6 are provided for adapting the frame to be slid into and secured in the rear frame of the camera.

As shown, the rear rectangular frame *a* of a camera comprises side walls *b* and *c* and top and bottom walls *d* and *e*, these walls adjacent their rear edge being provided with grooves or slideways *f*. The section *g* of one of the walls, as for example, side wall $b$, is separate from this wall and may be hinged at one end to be swung to allow the frame 1 to be slid into frame $a$ with its beads or tongues 6 engaging in grooves $f$, the strip or door $g$ being then closed to engage the bead on the corresponding side of the frame 1 and to rigidly lock the frame 1 to the camera structure. The groove and tongue engagement shown securely and rigidly locks the parts together and forms a light-proof arrangement.

Secured to the rear edges of the frame 1 is a main supporting plate 7 of rectangular shape and of a width preferably equal to the height of the frame 1, but of a length greater than the width of the frame 1, so as to extend equal distances to either side of the frame 1. This plate has a central rectangular opening 8 communicating centrally with the interior of frame 1. Extending longitudinally across and secured to the rear face of the plate or frame 7 adjacent the upper and lower edges thereof are bars 9 and 10 under-cut at their inner under edges to leave rectangular slideways 11 and 12 respectively for accommodating the rectangular carriage plate 13, the slide grooves extending longitudinally entirely across the main frame 7 so that the carriage, which is preferably of the same length as the main frame, can be slid longitudinally across the main frame to project beyond either end thereof. The main frame 7 and the slide frame or carriage 13 are preferably constructed of wood in the manner well known in the art to be prevented from warping or becoming distorted. The slide frame or carriage supports adjustable focusing mechanism and adjustable plate holder mechanism.

The focusing mechanism comprises a rectangular frame 14 cut down along its inner edges to form a seat 15 for accommodating a ground glass focusing plate 16. The opening surrounded by frame 14 registers with a rectangular opening 17 through the carriage 13, which is of the same size as the central opening 8 through the main frame 7. To exclude light during focusing operation a hood 18 is preferably provided and mounted in any suitable manner on frame 14 about and over the focusing plate 16.

The frame 19 for supporting the detachable plate holder 20 comprises upper and lower horizontal bars 21 and 22 and a vertical bar 23 connecting the inner ends of bars 21 and 22, these bars being rigidly secured to the carriage 13 about the rectangular opening 24 provided in the carriage. With this arrangement the carriage 13 can be slid longitudinally along the main frame 7 to carry either the focusing opening 17 into register with central opening 8 or to carry the plate opening 24 into register with the central opening 8. I preferably provide mechanism for more accurately effecting such shifting adjustment of the carriage 13, and as shown, a rack bar 25 is secured to the lower bar 22 of the plate holder frame and extends inward longitudinally and has meshing engagement with a pinion 26 mounted on shaft 27 journaled in a bracket 28 secured to and extending rearwardly and upwardly from the main frame 7 below the lower guide bar 10. The rear end of shaft 27 has a crank handle 29 secured thereto, and turning of this crank handle will turn the pinion 26 to cause longitudinal movement of the rack bar 25 engaged by the pinion and horizontal shifting of the carriage 13 in the desired direction along main frame 7. With this arrangement accurate alining and centering of the focusing mechanism or plate mechanism can be readily effected, and such adjustment will be automatically maintained. The rack bar 25 may extend inwardly from plate holder frame 19, as shown, so that the entire adjustment of the carriage can be accomplished upon turning of the crank 29, or this rack bar may extend only along the lower bar 22 of frame 19 so that only the centering adjustment of the plate holder mechanism can be accomplished by the turning of crank 29.

In Figs. 5, 7 and 11 I have shown plate holder mechanism of a construction particularly desirable and adaptable in connection with my attachment. The frame 20 comprises upper and lower walls 30 and 31 and inner and outer side walls 32 and 33. The inner faces of the walls of frame 20 are stepped gradually to form seats for various parts. The upper step 34 accommodates a cover 35, shown as hinged at 36 to the outer side wall 33 and provided at the opposite edge with a latch bar 37 for engaging in latch hook 38 secured to the inner side bar 32. The third step 39 serves for the accommodation of kits 40 which may have central openings 41 of a contour and size depending upon the size and shape of the plate to be accommodated, the inner edge of the kit being stepped down a distance to leave a seat 42 for receiving the photographic plate 43. The second step 44 accommodates a pad 45 secured to the inner face of the cover 35 to engage snugly against the outer face of the plate 43 when the cover is closed, to thus securely hold the plate to its kit 40 and to exclude all light therefrom. The inner step 46 is slotted to accommodate the exposure slide or shutter 47, this slide extending into the plate holder frame through slot 48 provided in the outer side bar 33 and engaging at its upper and lower edges in slots 49 and 50 (Fig. 11) formed in the upper and lower bars 30 and 31, while the inner edge of the exposure slide when the plate is closed engages in the slot 51 cut in the inner side bar 32 of the plate holder frame (Fig. 7). This slide can therefore be slid into or out of the plate holder frame to control the exposure of the photographic plate 43. The outer end of the exposure slide is secured to a vertical bar 52 by means of which the plate can be readily manipulated. As best shown in Figs. 1, 5 and 11, the section of the rack bar 25 along the lower bar 22 of the plate holder supporting frame 19 slightly overhangs the upper edge of the bar 22, and when the plate holder is to be inserted in the supporting frame its lower edge is first set on bar 22 between the overhanging rack bar and the carriage 13, and the top of the plate holder is then swung against the carriage 13 until a pin 53 extending from the upper bar 30 of the plate holder is received by a spring tongue 54 mounted in pocket 55 in the upper bar 21 of frame 19. The plate holder will thus be rigidly locked to and against the carriage 13 to travel with this carriage upon adjustment thereof. After a plate has been inserted in the holder and the holder applied to the carriage the carriage is first shifted toward the right to bring the focusing frame into register with the central opening 8 of the main frame 7, and after proper focus has been adjusted for the carriage is shifted toward the left to position the opening 24 centrally with reference to the opening 8, whereupon the exposure slide or shutter 47 is withdrawn to expose the plate to openings 24 and 8, and the lens mechanism is then operated and the photograph taken in the ordinary manner. After this the exposure slide can be shoved back into the plate holder frame and the entire plate holder removed for the insertion of a fresh plate.

As above described, the exposure slide 47 can be adjusted manually, but I prefer to accomplish this adjustment automatically upon relative movement of the carrier and main supporting frame. This is effected by means of spring clips 56 and 57 secured with reference to main frame 7 and adapted for engagement at their apertured ends 56$^e$ and 57$^o$ with pins 58 and 59 extending from the ends of the exposure slide bar 52. I preferably mount the spring clips to be longitudinally adjustable with reference to main frame 7, so as to be able to adjust for the distance which it is desired to have the slider plate move into or out of the plate holder frame. As shown, the upper and lower guide bars 9 and 10 for the carriage 13 have each secured thereto a pair of longitudinal guide bars 60 and 61 whose adjacent under edges are cut away to form a guide channel 62, the inner ends of the bars being separated by a gap 63. Within the channel 62 of each set of bars a rack bar 64 is inserted to slide longitudinally. A plate 56' mounting the spring clip 56 slidably engages the upper bars 60 and 61 and has a stud 65 secured to the corresponding rack bar 64. Directly opposite and slidable on the lower bars 60 and 61 is a similar plate 57' mounting spring clip 57, this plate having a stud 65' secured to the corresponding rack bar 64, the studs of the plates passing through the gaps 63 between the bars. Upon longitudinal movement of the rack bars the plates 56' and 57' will be adjusted longitudinally to time the engagement of the spring clips with the pins 58 and 59 on the exposure slide bar 52. As a means for simultaneously moving the spring clip supporting plates I provide gears 66 and 66' for engaging with the respective rack bars 64, these gears being mounted on a transverse shaft 67 journaled in bearings 68 extending forwardly from the main frame 7, the shaft being provided at its lower end with a crank 69. As best shown in Fig. 4 gear 66 extends through a slot 70 cut through the main frame 7 and the upper guide bar 9 and into meshing engagement with the upper rack bar 64, and for the gear 66' a similar slot 70' is provided extending through frame 7 and the lower guide bar 10. Upon turning of the crank 67, therefore, both rack bars 64 will be simultaneously shifted longitudinally and the spring clips simultaneously adjusted. The spring clips deflect toward each other to hold their ends in the path of the pins 58 and 59 and also to be in the path of the beveled ends 21' and 22' of the upper and lower bars 21 and 22 of the plate holder supporting frame.

As shown in Figs. 1, 2 and 3, the focusing mechanism is in central position with reference to the camera, and the spring clips are spread apart by the engagement of their ends with the bars 21 and 22, the exposure slide 47 being entirely in the plate holder frame to seal the photographic plate within the plate holder. After proper focal conditions have been established crank 29 is turned and the carrier shifted toward the left to bring the plate holder in photographic position with reference to the camera. As soon as the ends of the spring clips reach the tapered ends 21' and 22', the springs will deflect toward each other to eventually carry their apertured ends onto the pins 58 and 59 of the exposure slide to thus receive and hold the slide so that upon final movement of the plate holder into photographic position the plate holder will be drawn away from the now stationary exposure slide, whereby the inlet opening 24 to the plate holder will be exposed, this being plainly shown in Figs. 5 and 7.

As before stated, the plate holder can be adapted for containing any sized plate by inserting the corresponding sized kit 40 in the holder, and the spring clip frames can be adjusted so that there will be just enough relative movement between the plate holder and the slider plate to expose the plate when the plate holder reaches the central position with reference to the camera. As shown, a 4x5 kit 40 is inserted and supports a 4x5 plate, and the spring clip frames are adjusted so that the exposure plate need be withdrawn only sufficiently to entirely expose the plate. Each spring clip supporting plate has its outer edge extended to an indicating point 71 for coöperating with scale marks 72 on the adjacent guide bar to assist in setting the plates to give the desired adjustment of the spring clip ends with reference to the slider plate. After a picture has been taken crank 29 is actuated in the opposite direction to move the carriage 13 toward the right from the position indicated in Figs. 5 and 7. The exposure slide 47 will be held stationary by the spring clips until the plate holder frame on the carriage has traveled to be closed by the slide, whereafter the tapered ends 21' and 22' will engage with the spring clips to spread these clips apart and away from the exposure slide pins, and thereafter the plate holder and slide will move together to the position shown in Figs. 1 to 3. The plate holder can now be bodily removed from its supporting frame to have a new plate inserted therein, or another plate holder can be inserted in the supporting frame 19. If a different sized plate is to be used a corresponding kit 40 is applied in the plate holder to receive the plate, and the spring clips adjusted by operation of crank 67, so that upon subsequent manipulation of the carriage the exposure slide will be moved correspondingly to expose the plate and then to re-seal the plate holder. Thus the same plate holder can be utilized for accommodating a number of different sized plates, and the plate holder will be opened and closed automatically upon shifting of the carriage to bring the plate holder into and out of photographic center.

In prior construction and procedure the ground glass focusing plate is provided on the camera and is first used to bring the camera to focus, whereafter the plate holder is slipped in between the ground glass frame and the lens, or the ground glass holder is first applied in the camera, and then removed and the plate holder substituted, and after insertion of the plate holder the exposure slide is withdrawn. This procedure, involving a number of manipulations of inserting and withdrawing, is very apt to disturb the focal adjustments, and sometimes plates will be spoiled by forgetting to reinsert the exposure slide before withdrawal of the plate holder. In my arrangement the carriage can be readily and accurately shifted to make focal adjustments and then readily and accurately and without disturbing the focal adjustments be shifted to bring the plate holder into the photographic field and the contained plate into focus, and there is no danger of forgetfulness to either withdraw the exposure slide or to reinsert the slide, this being taken care of entirely automatically upon adjustment of the carriage. The entire attachment can also be quickly and accurately applied to various styles of camera in place of the ordinary plate holder, and the attachment can be as quickly removed. The attachment is of particular advantage and desirability in portrait work, where the subject is apt to move after being focused. With the old way considerable time elapsed between focusing and the insertion of the plate holder, but with my attachment the plate can be quickly brought into place after focusing adjustment and the lens actuated to take the picture.

In the construction of the attachment the fit between the sliding carriage and its guide bars 9 and 10 should be such as to prevent entrance of light between the carriage and the main frame 7. As a further precaution against the entrance of light between these members rollers 73 and 74 are provided at opposite sides of the central opening 24 of the main frame 7, these rollers being mounted in front of the frame 7 and within the frame 1, as illustrated in Figs. 4, 7 and 8. Roller 73 projects through slot 75 extending transversely of board 7, the roller shaft 76 being journaled in elongated bearings 77 each containing a light compression spring 78 abutting against the bearing head and the corresponding end of the shaft, the tendency of these springs being to press the roller against the adjacent face of the carriage. Likewise, a slot 75' is provided for roller 74 in frame 7, the shaft 76' of this roller being mounted in elongated bearings 77' each having a spring 78' interposed therein. As best illustrated in Fig. 7, the rollers press lightly against the adjacent face of the carriage and prevent entrance of light between said carriage and frame 7.

I also provide improved means for quickly and accurately adjusting the size and shape of the opening 8 through the main frame 7, this being preferably accomplished by means of a diaphragm in the form of a sheet or band having openings of various size and shape cut therein. For accommodating this diaphragm mechanism vertical partitions 80 and 81 are provided in the frame 1 adjacent the opening 8 through frame 7. Between the upper ends of these partitions is interposed a horizontal roller 82 whose shaft 83 extends through the partitions to have bearing therein, and between the lower ends of these partitions a similar roller 84 is journaled. Below the upper roller 82 a feed roller 85 is mounted on a shaft 86 extending through and journaled in the partitions. Above the lower roller 84 is an intake roller 87 mounted on shaft 88 extending through and journaled in the partitions. The diaphragm 89 in the form of a long band of paper, metal or other material or fabric is wound at one end about feed roller 85 and loops first about the upper roller 82 and then the lower roller 84 and its other end wound about the intake roller 87, the section 89′ of the band between the upper and lower rollers sliding against the front face of frame 7 and across the opening 8 therethrough. This band has successive openings 90 cut therein and of varying shape and size, and upon turning of the rolls any of these openings may be brought into the desired position with reference to the main opening 8 and the lens L of the camera to which the attachment is applied. As a means for effecting turning of the rolls I provide mechanism controlled by a crank 91 disposed on the rear side of the boards 7 preferably near the top thereof.

The transmission mechanism comprises a gear 92, an intermediate gear 93, and a pinion 94 secured to the inner end of the shaft 95 mounting the crank lever 91. The gear 92 is secured to the projecting end of shaft 86 of upper roller 85 and engages with the straight gearing surface 93′ of gear 93, this gear being mounted on a shaft 96 journaled in partition wall 81 and the side wall 3. The bevel pinion 94 is journaled in frame 7 and in a cross bar 97 extending between walls 83 and 84, and meshes with the bevel gearing surface 93″ of gear 93. Turning of crank 91 will therefore result in travel of the diaphragm across the opening 8. In order to keep the diaphragm section 89′ taut across the opening 8 the intake roller 87 may be provided with a gravity pawl and ratchet mechanism and a spring 99 operating in the well known manner, as in the ordinary spring shade rods, and the feed roller 85 may be braked, as by means of a spring 100 secured to partition 81 and having frictional engagement with the projecting end of shaft 86. One end of the intake roll 87 pivots a ratchet disk 101 from which extends a flat tongue 102 which engages in slot 103 in partition 81, and with this ratchet disk coöperates a pawl 104 pivoted to the end of the roller 87, the spring 99 connecting at one end with the roller 7 and at its other end with the disk. When the rolls are rotated slowly to carry the diaphragm outwardly past the openings 8 they will be locked by an engagement of the pawl with the ratchet disk upon release of the crank arm 91. To cause movement of the diaphragm in reverse direction the crank is first turned quickly to carry the diaphragm outwardly and to draw the pawl out of the ratchet disk, and is then turned rapidly in reverse direction to allow the spring 99 to rotate the intake roller, this operation being substantially the same as that of an ordinary window shade.

In order to indicate to the operator what particular diaphragm opening is in position at the opening 8 I provide indicating mechanism readable from the rear of the attachment for designating such information. As best shown in Figs. 1, 5 and 11, a small rectangular opening 105 is provided through the main frame 7 at the top thereof to register with one end of the upper roller 82 over which the diaphragm passes, and on the diaphragm is printed information with reference to the diaphragm openings to appear adjacent opening 105 as the diaphragm is moved. For example, say that the 4 in. by 5 in. opening is in position before opening 8, the printed information 4x5 on the diaphragm would appear adjacent opening 105, as indicated in Fig. 1, to advise the operator that the 4x5 opening is in proper position. In the same manner, each diaphragm opening has its size designated on the diaphragm, and this designation will appear at the opening 105 when this diaphragm opening appears in proper place at opening 8.

In order to prevent light from entering the frame 1 the opening 105 is surrounded by a rectangular frame 106 whose side walls are slotted at 107 to receive the closure plate 108, and in order to automatically shift the plate to open and closed position the focusing frame 14 has a spring extension 109 whose end coöperates with the abutment extension 110 on the plate. As shown in Fig. 5, the shutter 108 is closed. When a picture is now to be taken the carriage 13 is shifted to the right to bring the focusing frame 14 in central position over opening 8. During such movement the extension 109 will engage with the abutment extension 110 of the shutter and will open the shutter. The operator now turns crank arm 91 until the desired size designation appears at opening 105, he then knowing that the desired diaphragm opening is in proper position at opening 8. After focusing the carriage 13 is re-shifted to the left for the purpose of bringing the plate mechanism into adjustment, and during such reverse shifting of the carriage the extension 109 again engages with the shutter and causes closure thereof, thus preventing the entrance of any light through opening 105.

As a means for indicating the number of pictures taken suitable register mechanism 111 is mounted on frame 7 and has an actuating arm 112 extending into the path of the spring extension 109 on the focusing frame, this indicating mechanism being, therefore, actuated each time that the carriage 13 is shifted back and forth. Thus the indicating mechanism will show the number of pictures which have been taken.

My improved attachment can also be used with great accuracy and efficiency for localizing pictures at different parts of a plate, the diaphragm for this purpose being provided wtih openings to be brought into proper position with reference to the plate. Adjustment for such work can be assisted by the relative adjustment between the plate holder frame $a$ of the camera and the lens supporting frame L. As shown in Fig. 11, the lower wall of the frame $a$ has the tongue 113 having dove-tail engagement in the supporting board 114 mounted for longitudinal adjustment on the bed $m$ by means of rollers $n$, while the lens frame L has also a tongue 115 dove-tailed into the mounting board 116. The lens $l$ is mounted on the lens board O adjustable vertically in slots $p$ in frame L in the ordinary manner. With these various adjustments the image can be focused to appear on any desired localized space of a plate, and upon shifting of the diaphragm to bring various openings into various positions with reference to a plate several exposures can be taken on a single plate without the necessity of withdrawing the plate from the plate holder. The opening 8 through the main frame 7 can if desired be reduced or otherwise adjusted by means of suitable kits 117, the edges of opening 8 being cut down to form a seat 118 for these kits so that these kits will not interfere with the free sliding of the carriage 13 across the frame 7.

The operation of my improved attachment has been brought out at various stages in the preceding description, and a repetition of the operation is not necessary. It is evident that the attachment can be readily applied to cameras in place of the ordinary single plate holders, and by the use of the attachment the time of manipulation is reduced to a minimum and much more accurate, reliable and more extended photographic work can be accomplished. The attachment is of particular utility when used in connection with the enlarging and copying apparatus and arrangement disclosed in my co-pending application executed of even date with this application. All the adjustable parts of the attachment are controllable from the rear of the camera, and the adjustments can be quickly and accurately made to assure reliable results. Provision is made to prevent the entrance of light to all sensitive parts, and in practice, of course, the various parts will be so related that light dispersion will be eliminated.

Modifications in construction and arrangement are of course possible which would still come within the scope of my invention, and I do not therefore desire to be limited to the particular embodiments which I have shown and described, but

I claim the following:

1. In a camera attachment, the combination of a main frame adapted to be applied to a camera to communicate with the interior thereof, a carriage slidable on said frame and having an opening, a plate holder adapted to be secured to the carriage about said opening, a shutter and exposure slide for said plate holder, and detents mounted on said main frame in the path of said exposure slide and adapted upon movement of said carriage to bring the opening therein into register with the camera to engage with said exposure slide to draw said slide outwardly of the plate holder and to restore said slide when the carriage is returned to its normal position, said detents being adjustable on said main frame whereby the degree of opening of said exposure slide can be adjusted for.

2. In an attachment for cameras, the combination of a main supporting frame adapted to be applied to a camera to communicate with the interior thereof, a carriage slidable on said frame and having an opening adapted upon such sliding to be brought into and out of register with the camera to which the frame is applied, a plate holder frame secured to said carriage about said opening and a plate holder in said frame, an exposure slide for said plate holder, channel guide bars secured to the main frame adjacent the opposite edges of said carriage, a rack bar slidable in the channel bar, a detent secured to each rack bar and adapted to coöperate with the exposure slide upon movement of the carriage to carry the plate holder toward or away from the camera, a gear engaging with each rack bar, and a common shaft for said gears, rotation of said shaft causing simultaneous movement of said rack bars and adjustment of said detents with reference to the exposure slide whereby the degree of opening of said closure slide may be determined.

3. In an attachment for cameras, the combination of a main supporting frame adapted to be secured to a camera and having an opening communicating with the interior of the camera, a carriage slidable on said main frame and having an opening for coöperating with said main frame opening, plate holder mechanism on said carriage and about the opening therein, rollers mounted within said main frame adjacent the opening therein, a diaphragm adapted to be wound about said rollers and having various sized openings adapted to be carried past the main frame opening upon rotation of the rollers, and gear mechanism mounted on the main frame for operating said rollers, said main frame having an additional small opening and said diaphragm having designating characters adapted to pass by the said additional opening to indicate at said additional opening the particular diaphragm opening exposed to the camera.

4. In an attachment for cameras, the combination of a main supporting frame adapted to be applied to a camera to communicate therewith, a carriage slidable on said main frame and having an opening adapted to register with the camera, a focusing frame secured to the carriage about said opening, rollers within said main frame and a diaphragm wound on said rollers and having different sized openings adapted to be brought into register with said carriage opening upon rotation of the rollers, means carried by the main frame for controlling the rotation of said rollers, said main frame having an additional opening and said diaphragm having characters adapted to pass by said additional opening to indicate what particular diaphragm opening is in register with the camera and the carriage opening, a shutter for said additional opening, and an arm extending from the carriage for engaging with said shutter to open the shutter when the carriage is moved to bring the focusing mechanism opening into register with the camera and to engage with said shutter to close said additional opening when the carriage is moved to carry the focusing mechanism out of registration with the camera.

5. In an attachment for cameras, the combination of a main supporting frame adapted to be applied to a camera and having an opening to register with the interior of the camera, a carriage slidable on said main frame and having an opening, plate holder mechanism mounted on said carriage over the opening therein, rollers pivoted to said main frame adjacent the opening therein and engaging against said carriage for preventing the entrance of light to the camera when said carriage has been moved to bring the plate holder mechanism into register with the main frame opening.

In witness whereof, I hereunto subscribe my name this 12th day of December, A. D.. 1910.

CHARLES CALVERT LAMB.

Witnesses:
    HENRY SIMS,
    D. C. MCNAMARA.